United States Patent
Dick et al.

(10) Patent No.: US 10,142,368 B2
(45) Date of Patent: Nov. 27, 2018

(54) FACILITATING REMOTE ACCESS OF DEVICES IN A SECURE ENVIRONMENT

(71) Applicant: United Parcel Service of America, Inc., Atlanta, GA (US)

(72) Inventors: Brian Dick, Baltimore, MD (US); Marc Alan Schabb, Reisterstown, MD (US); Andrew J. Van Beek, Hunt Valley, MD (US); Daphne Davidson, New Freedom, PA (US); Maureen Hirokawa, Baltimore, MD (US)

(73) Assignee: UNITED PARCEL SERVICE OF AMERICA, INC., Atlants, GA (US)

( * ) Notice: Subject to any disclaimer, the term of this patent is extended or adjusted under 35 U.S.C. 154(b) by 466 days.

(21) Appl. No.: 14/842,552

(22) Filed: Sep. 1, 2015

(65) Prior Publication Data

US 2017/0063806 A1    Mar. 2, 2017

Related U.S. Application Data

(63) Continuation of application No. 14/842,433, filed on Sep. 1, 2015.

(51) Int. Cl.
*G06F 17/00* (2006.01)
*H04L 29/06* (2006.01)
(Continued)

(52) U.S. Cl.
CPC .......... *H04L 63/168* (2013.01); *G06F 3/0482* (2013.01); *G06F 3/04842* (2013.01);
(Continued)

(58) Field of Classification Search
CPC . H04L 63/0168; H04L 63/0428; H04L 63/18; H04L 67/02; H04L 63/0272;
(Continued)

(56) References Cited

U.S. PATENT DOCUMENTS 6,970,933 B1* 11/2005 Masters .............. H04L 67/1008
                                                    709/219
8,082,491 B1* 12/2011 Abdelaziz ............... G06F 9/465
                                                    709/201
(Continued)

OTHER PUBLICATIONS (IPEA/408) Written opinion under Chapter II dated Jul. 25, 2017 for WO Application No. PCT/US16/023408.
(Continued)

*Primary Examiner* — Sharon S Lynch
(74) *Attorney, Agent, or Firm* — Shook, Hardy & Bacon, L.L.P.

(57) ABSTRACT

Embodiments of the present invention provide methods, systems, apparatuses, and computer program products for facilitating remote access of customer computing entities in a secure environment. In one embodiment a method is provided comprising providing, by a first user computer entity and through a first window displaying a first webpage in a browser, a request for instruction for a particular device, the instructions being in a native command language of the particular device, wherein the request is provided over a first secure encrypted connection using a first protocol, receiving, the instructions over the first secure encrypted connection using the first protocol, initiating a bridge webpage, the bridge webpage being initiated in a second window in the browser, wherein the first window and the second window are in communication, and wherein the first page belongs to a first domain different from a second domain to which the second page belongs.

7 Claims, 18 Drawing Sheets

(51) Int. Cl.
*H04L 29/08* (2006.01)
*G06F 3/0482* (2013.01)
*G06F 3/0484* (2013.01)
*G06F 3/14* (2006.01)
*G06K 15/02* (2006.01)
*G06K 15/00* (2006.01)
*G06Q 50/28* (2012.01)

(52) U.S. Cl.
CPC .............. *G06F 3/14* (2013.01); *G06K 15/02* (2013.01); *G06K 15/4095* (2013.01); *H04L 63/0272* (2013.01); *H04L 63/045* (2013.01); *H04L 63/0428* (2013.01); *H04L 63/18* (2013.01); *H04L 67/14* (2013.01); *H04L 69/16* (2013.01); *G06Q 50/28* (2013.01); *H04L 67/02* (2013.01)

(58) Field of Classification Search
CPC .. G06K 15/02; G06K 15/4095; G06F 3/0482; G06F 3/04842
See application file for complete search history.

(56) References Cited

U.S. PATENT DOCUMENTS

| | | | | |
|---|---|---|---|---|
| 8,135,796 | B1* | 3/2012 | Slaughter | G06F 9/465 709/217 |
| 8,180,891 | B1* | 5/2012 | Harrison | H04L 63/10 709/224 |
| 9,037,963 | B1* | 5/2015 | Chandi | G06F 21/00 715/234 |
| 9,830,306 | B2* | 11/2017 | Leithead | G06F 9/541 |
| 2003/0078960 | A1* | 4/2003 | Murren | H04L 29/06 709/203 |
| 2004/0125402 | A1* | 7/2004 | Kanai | G06F 21/608 358/1.15 |
| 2005/0216421 | A1* | 9/2005 | Barry | G06F 11/0709 705/64 |
| 2006/0227358 | A1* | 10/2006 | Brunninger | G06F 3/1204 358/1.14 |
| 2007/0282951 | A1* | 12/2007 | Selimis | H04L 67/06 709/205 |
| 2009/0327421 | A1* | 12/2009 | Fu | G06F 17/3089 709/204 |
| 2010/0268659 | A1* | 10/2010 | Zimberoff | G06Q 10/08 705/336 |
| 2010/0299205 | A1* | 11/2010 | Erdmann | G06F 21/6263 705/14.54 |
| 2011/0161990 | A1* | 6/2011 | Smith | G06F 17/30861 719/328 |
| 2011/0173441 | A1* | 7/2011 | Bagepalli | H04L 63/166 713/153 |
| 2011/0246772 | A1* | 10/2011 | O'Connor | H04L 63/0428 713/168 |
| 2012/0023158 | A1* | 1/2012 | Kashyap | H04L 63/0428 709/203 |
| 2012/0084222 | A1* | 4/2012 | Zimberoff | G06Q 10/08 705/330 |
| 2013/0056533 | A1* | 3/2013 | Zimberoff | G06Q 10/08 235/375 |
| 2013/0061337 | A1* | 3/2013 | Zimberoff | H04L 63/10 726/30 |
| 2013/0132833 | A1 | 5/2013 | White et al. | |
| 2013/0191880 | A1* | 7/2013 | Conlan | H04L 63/20 726/1 |
| 2013/0275570 | A1* | 10/2013 | Treuhaft | H04L 61/1511 709/223 |
| 2014/0019517 | A1* | 1/2014 | Fawcett | G06Q 10/0832 709/203 |
| 2015/0143223 | A1* | 5/2015 | Kolam | G06F 17/2247 715/234 |
| 2017/0078429 | A1* | 3/2017 | Toussaint | H04L 67/2814 |
| 2018/0007093 | A1* | 1/2018 | Fallows | H04L 67/42 |

OTHER PUBLICATIONS

International Searching Authority, International Search Report and Written Opinion for International Application No. PCT/US2016/023408, dated Jun. 13, 2016, 13 pages, European Patent Office, The Netherlands.

Non-Final Office Action received for U.S. Appl. No. 14/842,433, dated Mar. 14, 2018, 14 pages.

(IPEA/409) International Preliminary Report on Patentability Chapter II or (IB/373) International Preliminary Report on Patentability Chapter I dated Nov. 14, 2017 for WO Application No. PCT/US16/023408.

* cited by examiner

3 What are you shipping:

Number of Packages?
[1 ▼]

Use the same values for all packages:
[Yes ▼]

Packaging Type: ▣
[Other Packaging ▼] *

Weight:
[3] lb *

Package Dimensions: ▣
Lenght:   Width:   Height:
[    ] x [    ] x [    ] in.

Large or Unusually Shaped Packages ▣
☐ Large Package
☐ Additional Handling

Package Declared Value: ▣
[        ] USD

Note: Additional shipping fees may apply based on declared value.

904

4 How would you like to ship?

Service:
[UPS 2nd Day Air ▼] *   Compare Time and Cost ▣

Do you need additional services? ▣                    Fee?
☐ Send E-mail Notifications                          Free
☐ Receive Confirmation of Delivery                   Yes
☐ Deliver Without Signature                          Free
☐ Deliver On Saturday                                Yes
☐ Direct Delivery Only                               Yes
☐ C.O.D.                                             Yes
☑ Offset the climate impact of this shipment (UPS carbon neutral)   Yes Some services may require extra information. You will be able to enter the required information on the next page.

Create A Shipment

Shipment Confirmation

1102

Thank you. Your shipment has been processed.

We have received your shipping details and processed your payment. If you need to print shipping labels, print a receipt, or a return label, follow the steps below.

| | |
|---|---|
| Tracking Number: | 1ZX5R6000294154928 |
| Service: | UPS 2nd Day Air |
| Guaranteed By: | End of Day Friday, Jul 10, 2015 |
| Bill Shipping Charges to: | Shipper's Account X5R600 |
| Charges: | 20.51 USD |

Daily rates were applied to this shipment

Total Charged: 20.51 USD

1104

Print Shipping Documents

Select the items to print below. To print selected items select Print.
Label:
☑ Label Print labels using my UPS thermal Printer? [Yes ▼]
Receipt:
☐ Receipt Print receipt using my UPS thermal Printer? [No ▼]

[Print]

1106

Void This Shipment or Past Shipments

To void this shipment, select the Void This Shipment button. You can review and void past shipments in your shipping history.

[Void This Shipment]

FIG. 11

FACILITATING REMOTE ACCESS OF DEVICES IN A SECURE ENVIRONMENT

CROSS-REFERENCE TO RELATED APPLICATIONS

This application is a continuation of U.S. Nonprovisional application Ser. No. 14/842,433, filed Sep. 1, 2015, the contents of which as are hereby incorporated herein in their entirety.

BACKGROUND

Carriers often handle millions of pick-ups and deliveries on daily basis. Carriers typically arrange delivery of packages or mail between a consignor or a shipper and a consignee or a recipient. The carrier or consignor is typically responsible for placement of appropriate shipping labels on packages. The labels facilitate correct routing of packages to ensure that packages reach their correct shipping destination.

The shipping labels may include information/data provided by consignors/shippers and/or the shipping carrier. Today, many consignors/shippers have access to one or more printing devices that may be used to print shipping labels. However, current software for accessing the Internet may prevent the carrier from accessing consignor/shipper printers. Therefore, there is a strong need in the industry for a system that can automatically provide the carrier access to consignor/shipper printers and other devices. And although described in the transportation and logistics context, embodiments described herein have wide applicability outside of this context.

BRIEF SUMMARY

This specification relates facilitating remote access of customer computing entities in a secure environment.

In general, one innovative aspect of the subject matter described herein can be embodied in methods that include the actions of providing, by a first user computer entity and through a first window displaying a first webpage in a user application, a request for instruction for a particular device, the instructions being in a native command language of the particular device, wherein the request is provided over a first secure encrypted connection using a first protocol; receiving, by the first user computer entity, the instructions over the first secure encrypted connection using the first protocol; initiating a bridge webpage, the bridge webpage being initiated in a second window in the browser, wherein the first window and the second window are in communication, and wherein the first page belongs to a first domain different from a second domain to which the second page belongs; receiving, at the second window from the first window, data including the instructions; providing, by the second window, the instructions to an application for controlling the first device, the data being provided over an un-secure non-encrypted connecting using a second protocol; and providing the instructions in the native command language of the particular device to the particular device.

Other embodiments of this aspect include corresponding systems, apparatus, and computer programs, configured to perform the actions of the methods, encoded on computer storage devices.

These and other embodiments can each optionally include one or more of the following features. receiving a list of devices at the second window, the list of devices being devices configured to receive the instructions, the list being received over the un-secure non-encrypted connecting using the second protocol; and receiving a user selection of the particular device from the list of devices.

Other embodiments of this aspect include corresponding systems, apparatus, and computer programs, configured to perform the actions of the methods, encoded on computer storage devices.

These and other embodiments can each may optionally include one or more of the following features. receiving, at an application belonging to a first domain, a request for instructions for a particular device belonging to a second domain, the instructions being in a native command language of the particular device, wherein the request is provided over a first secure encrypted connection using a first protocol; providing, to a server, the request for instructions over a connection using a second protocol; responsive to receiving the request at the server, providing data comprising the instructions over the connection using the second protocol; and providing, to a first user computing entity, the instructions being provided over the first secure encrypted connection using the first protocol.

Particular embodiments of the subject matter described herein can be implemented so as to realize one or more of the following advantages. Allow carriers remote access of customer computing entities in a secure environment. In turn, this enhances the overall network security for customers (consignors and consigand carriers and reduces network vulnerabilities. Additionally, embodiments of the invention facilitate label printing according to the carrier rules and requirements using customer computing entities. In turn, this enhances the customer experience and reduces the carrier's costs associated with printing.

The details of one or more embodiments of the subject matter described herein are set forth in the accompanying drawings and the description below. Other features, aspects, and advantages of the subject matter will become apparent from the description, the drawings, and the claims.

BRIEF DESCRIPTION OF THE DRAWINGS

Figure 1:
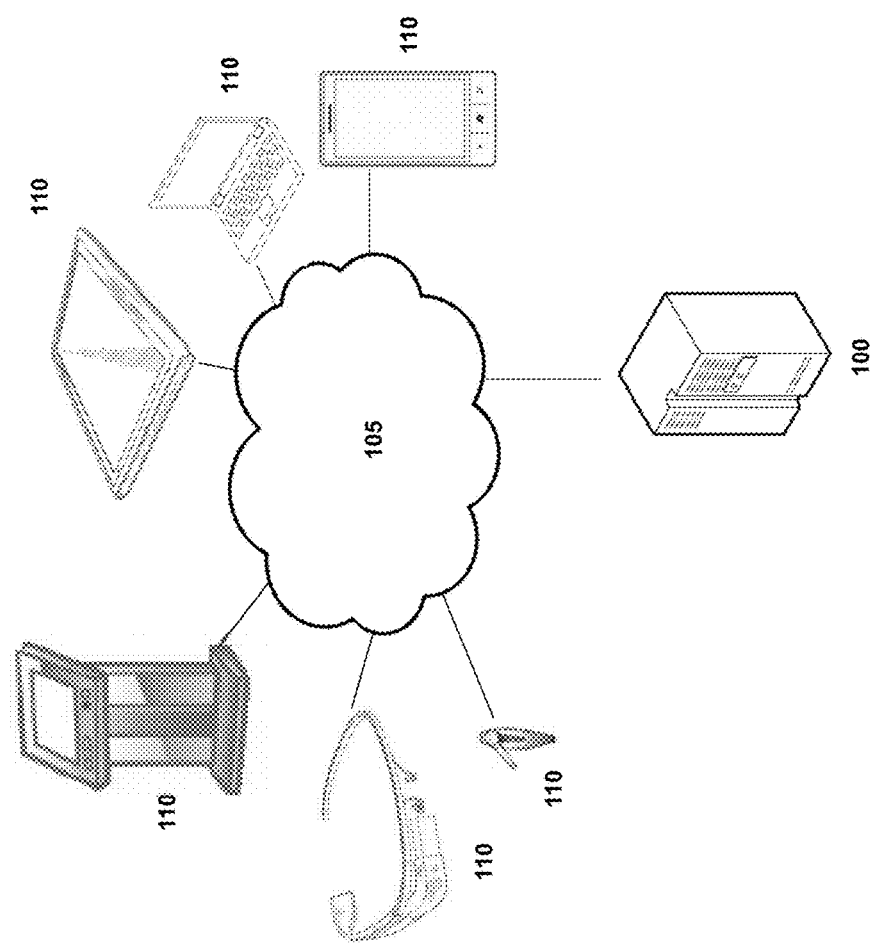
Figure 2:
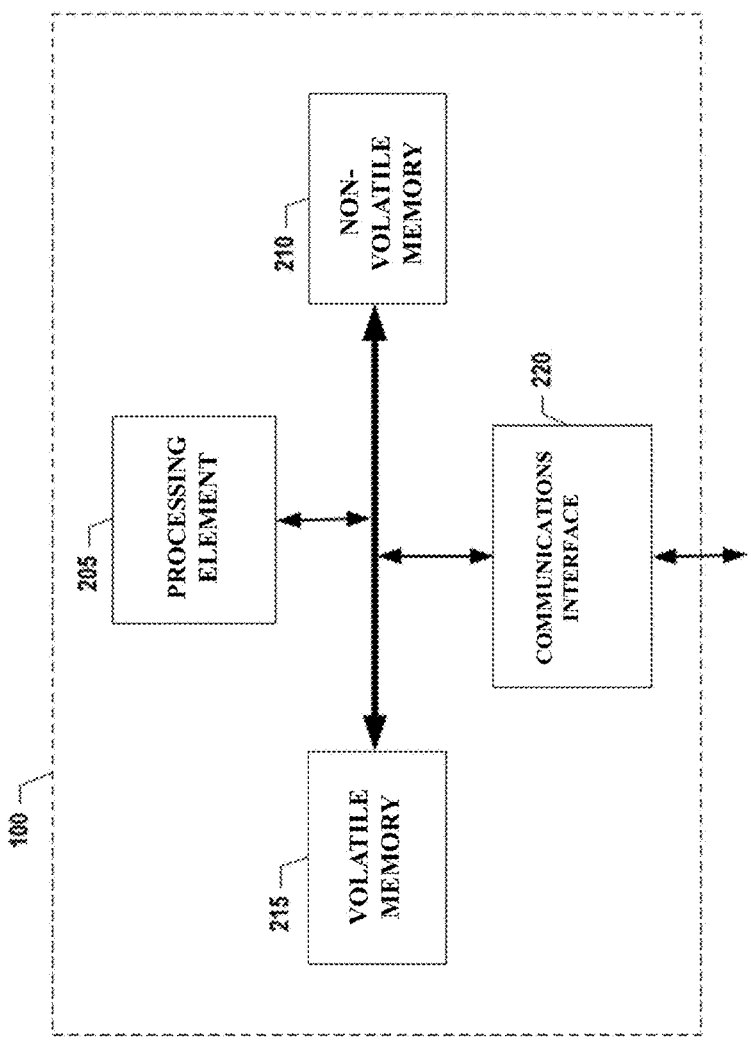
Figure 3:
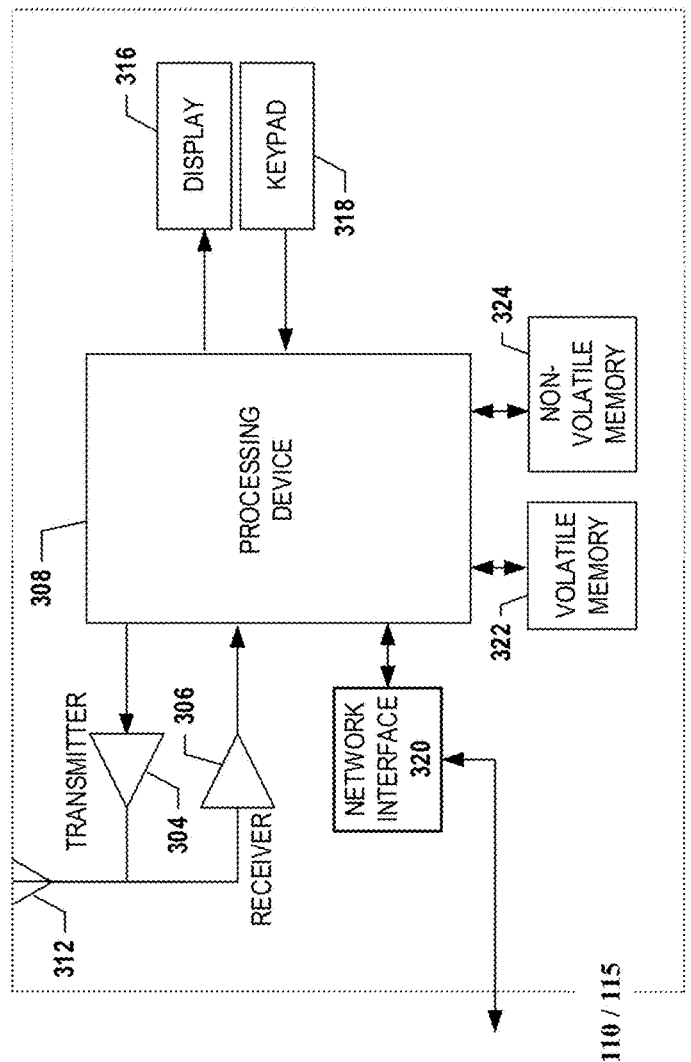
Figure 7A:
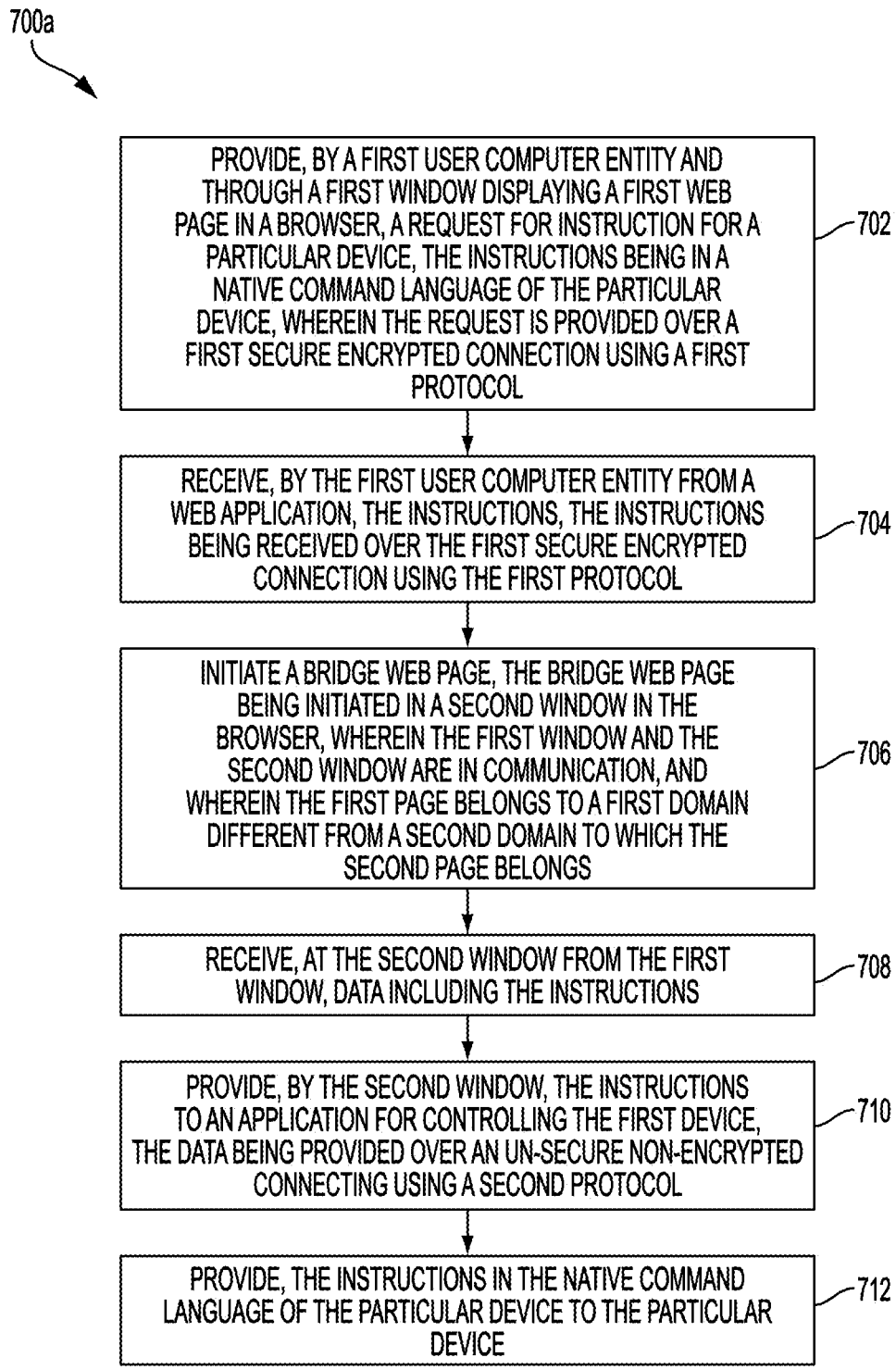
Figure 7B:
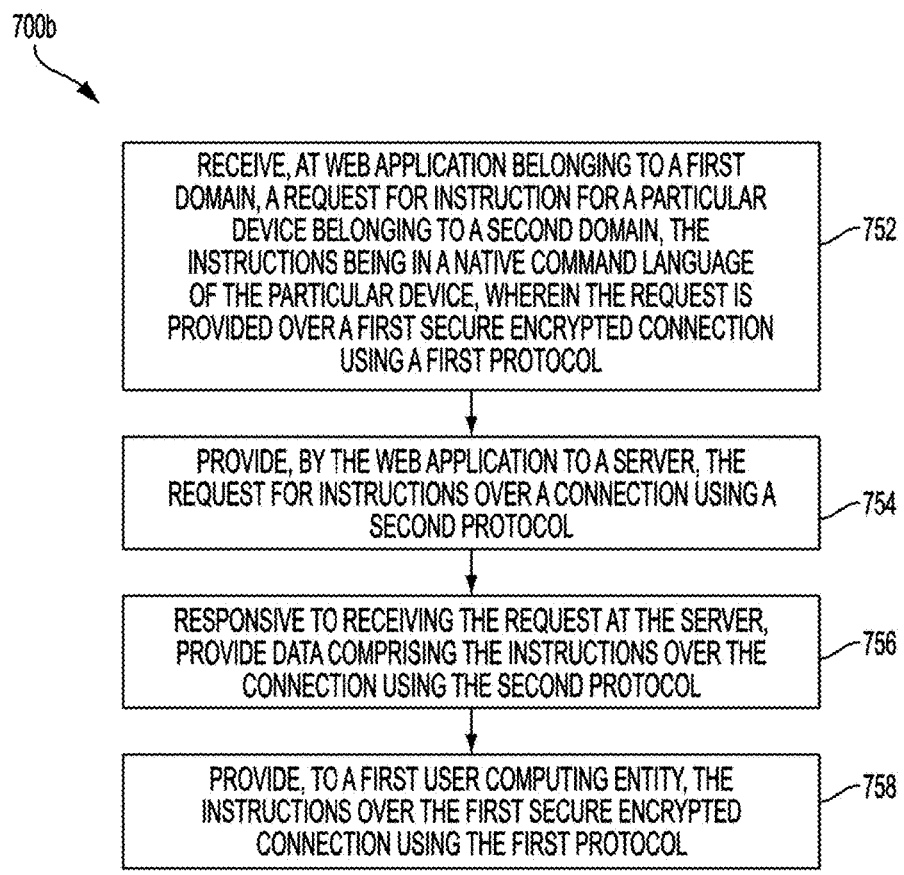

Having thus described the invention in general terms, reference will now be made to the accompanying drawings, which are not necessarily drawn to scale, and wherein:

FIG. 1 is an overview of a system that can be used to practice embodiments of the present invention;

FIG. 2 is an exemplary schematic diagram of a management computing entity according to one embodiment of the present invention;

FIG. 3 is an exemplary schematic diagram of a user computing entity according to one embodiment of the present invention;

FIGS. 4-5 and 6A-6B are information/data flow diagrams illustrating exemplary information/data flows associated with completing various procedures and operations in accordance with various embodiments of the present invention;

FIGS. 7A and 7B are flow charts illustrating various procedures and operations that may be completed in accordance with various embodiments of the present invention; and FIGS. 8-16 illustrate example views of the interactive user interface, in accordance with various embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, And Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more carrier computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier Computing Entity

FIG. 2 provides a schematic of a carrier computing entity 100 according to one embodiment of the present invention.

A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the terms computing entity, computer, entity, device, system, and/or similar words used herein interchangeably may refer to, for example, one or more computers, computing entities, desktop computers, mobile phones, tablets, printers (including thermal printers), phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the carrier computing entity 100 may communicate with user computing entities 110 and/or a variety of other computing entities.

As shown in FIG. 2, in one embodiment, the carrier computing entity 100 may include or be in communication with one or more processing elements 205 (also referred to as processors, processing circuitry, and/or similar terms used herein interchangeably) that communicate with other elements within the carrier computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier computing entity 100 with the assistance of the processing element 205 and operating system.

As indicated, in one embodiment, the carrier computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier computing entity 100 may include or be in communication with one or more input elements, such as a keyboard input, a mouse input, a touch screen/display input, motion input, movement input, audio input, pointing device input, joystick input, keypad input, and/or the like. The carrier computing entity 100 may also include or be in communication with one or more output elements (not shown), such as audio output, video output, screen/display output, motion output, movement output, and/or the like.

As will be appreciated, one or more of the carrier computing entity's 100 components may be located remotely from other carrier computing entity 100 components, such as in a distributed system. Furthermore, one or more of the components may be combined and additional components performing functions described herein may be included in the carrier computing entity 100. Thus, the carrier computing entity 100 can be adapted to accommodate a variety of needs and circumstances. As will be recognized, these architectures and descriptions are provided for exemplary purposes only and are not limiting to the various embodiments.

2. Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like and are used interchangeably herein. For instance, a user may operate a user computing entity 110 (also referred to herein customer computing entities and/or similar names) that includes one or more components that are functionally similar to those of the carrier computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, printers (including thermal printers), phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier computing entity 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information/data from the carrier computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier computing entity 100 and/or various other computing entities.

In another embodiment, the user computing entity 110 may include one or more components or functionality that are the same or similar to those of the carrier computing entity 100, as described in greater detail above. As will be recognized, these architectures and descriptions are provided for exemplary purposes only and are not limiting to the various embodiments.

III. Exemplary System Operation

As described above, the carrier computing entity 100 and/or user computing entity 110 may be configured for storing information/data associated with an item and/or an action, providing information/data associated with a good/item and/or action to a user, providing tools for a user accessing or providing information/data associated with a good/item and/or action, and/or aiding in user access and provisioning of information/data associated with an item and/or action. As will be recognized, a package may be any tangible and/or physical object. In one embodiment, a package may be one or more parcels, envelopes, bags, containers, loads, crates, goods/items banded together, pallets, drums, and/or similar words used herein interchangeably. Such packages, items, and/or contents may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. In this regard, in some example embodiments, such packages, items, and/or contents may communicate send "to" address information/data, received "from" address information/data, unique identifier codes, and/or various other information/data. The user interface is for receiving shipping information/data as input from a user of a user computing entity 110.

According to various embodiments, the carrier computing entity 100 and/or user computing entity 110 provides and/or aids in the access and provisioning of information/data in accordance with user instructions and/or input received via the carrier computing entity 100 and/or user computing entity 110 (e.g., via a user interface). The user interface may be accessible from a user computing entity 110 (e.g., in communication with the carrier computing entity 100 via the network 105). For example, in various embodiments, a user may log in to the carrier computing entity 100 from a user computing entity 110 (e.g., by opening a log-in page and entering a user ID and password using display 316 and keypad 318). The carrier computing entity 100 may be configured to recognize any such log-in request, verify that the user has permission to access the system (e.g., by confirming the user ID and password are valid), and present/provide the user with a user interface (e.g., displayed on display 316). In other embodiments, user log-in is not required to access the user interface. Various embodiments of the user interface are discussed in the following sections in more detail.

As the number of internet security vulnerabilities and attacks continue to increase, web browser providers are introducing more and more security requirements for using their respective browsers. Some providers may no longer support unsecure and/or non-encrypted protocols and/or connections. For example, some providers may support a Hyper Text Transfer Protocol Secure (HTTPS) and not support Hyper Text Transfer Protocol (HTTP). HTTPS is a secure counter of HTTP, over which information/data is transferred between browsers (e.g., user applications, browsers, user interfaces, and/or similar words used herein interchangeably) and websites that users are accessing. In turn, HTTPS results in a secure and/or encrypted communication between browsers and websites.

Similarly, in order to increase security, web browsers may also no longer support specific plug-ins or specific versions of plug-ins. Plug-ins are software components that allow addition of specific features to browsers or other applications. Such features provide customization options to users of the web browser. For example, plug-ins may allow a web browser to process files that are not supported by the web browser. For example, a plug-in may allow browsers to open PDF files, video files, audio files, or open pages containing Java code. Netscape Plugin Application Programming Interface (NPAPI) plug-ins provide an unsecure, non-encrypted communication link. Therefore, some browsers may not support NPAPI plug-ins. NPAPI is a cross-platform plug-in architecture that allows full permissions to a current user. For example, code running NPAPI plug-in has permission to access devices of the current user. However, because of the security vulnerabilities discussed above, NPAPI plug-ins are currently being disabled by browsers. For example, Google Chrome and Microsoft Edge may no longer support NPAPI plug-ins or other forms of unsecure, non-encrypted communications.

As described herein, embodiments of the present invention recognize these and other security measures enforced by web browsers that may block third party remote access of user devices/computing entities, even when authorized by a respective user. For example, these security measures may prevent the carrier from accessing a consignor/shipper printer in order to print a shipping label for placement on a package. As described above, since the shipping labels require information/data from both the consignor/shipper and the carrier, carrier access to the printer may be required. An exemplary information/data flow diagram that allows the carrier to remotely access consignor/shipper printers is described below with reference to FIGS. 4 and 5. The information/data flows described may also facilitate access to other devices. Similarly, the information/data flows may be used to transfer data associated with authentication processes.

1. Exemplary Information/Data Flows Associated with Allowing a Carrier Access to a Consignor/Shipper Computing Entity in a Secure Environment a. Example 1

Figure 4:
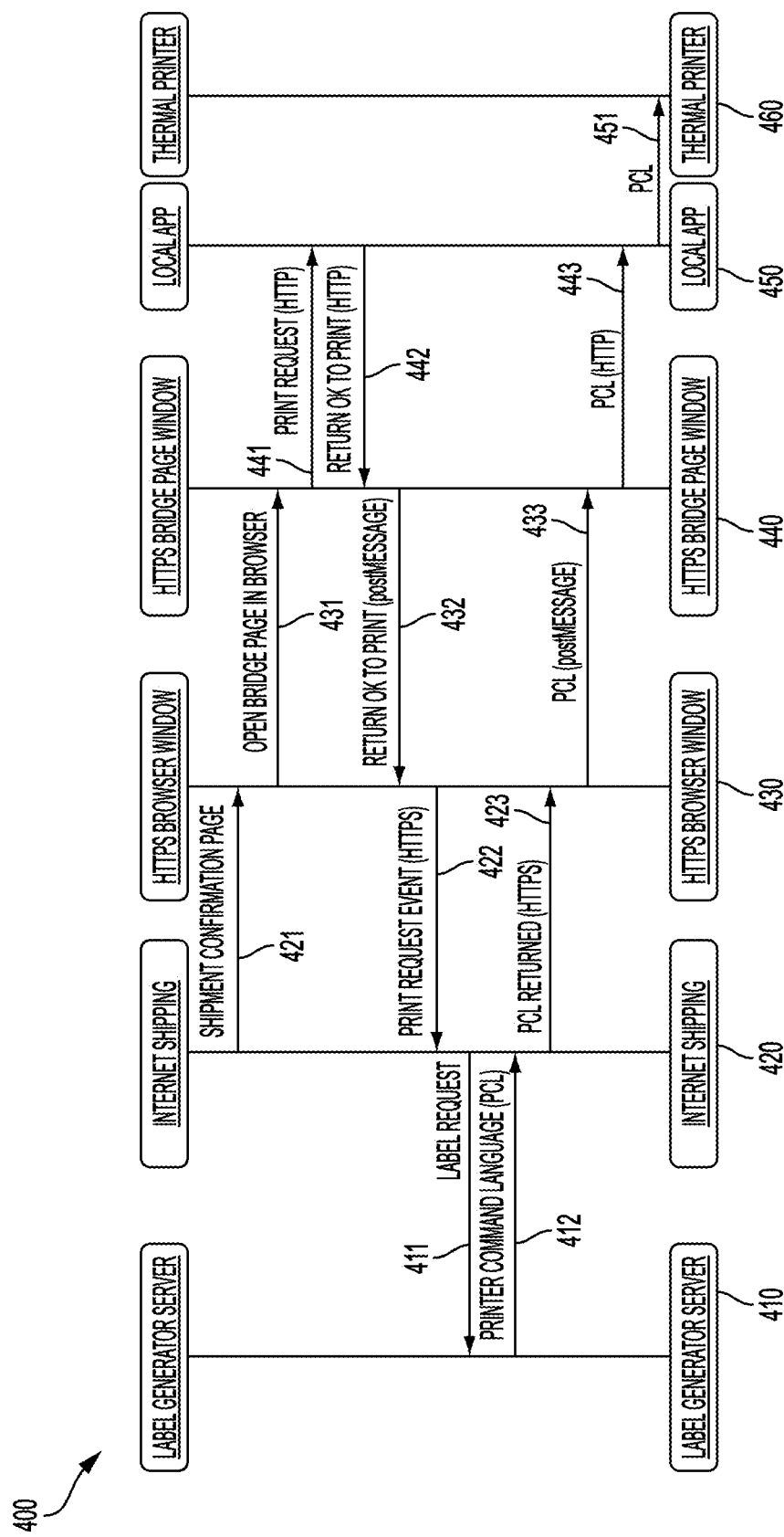

FIG. 4 is an information/data flow diagram for printing shipping label using a secure browser. In some implementations, the process for printing a shipping label may begin with a consignor/shipper accessing a carrier's web application for shipping. For example, in an outbound shipping context, the consignor/shipper may access an internet shipping web application 420 of the carrier to provide shipping information/data that can be used to generate a label. In some embodiments, the consignor/shipper (e.g., operating a user computing entity 110) may be provided with a user interface for providing shipping information/data. For example, a user (e.g., operating a user computing entity 110) may be prompted by the web application to provide origin address information/data, destination address information/data, information/data regarding the contents of the package, payment information/data, and/or the like.

Figure 8:
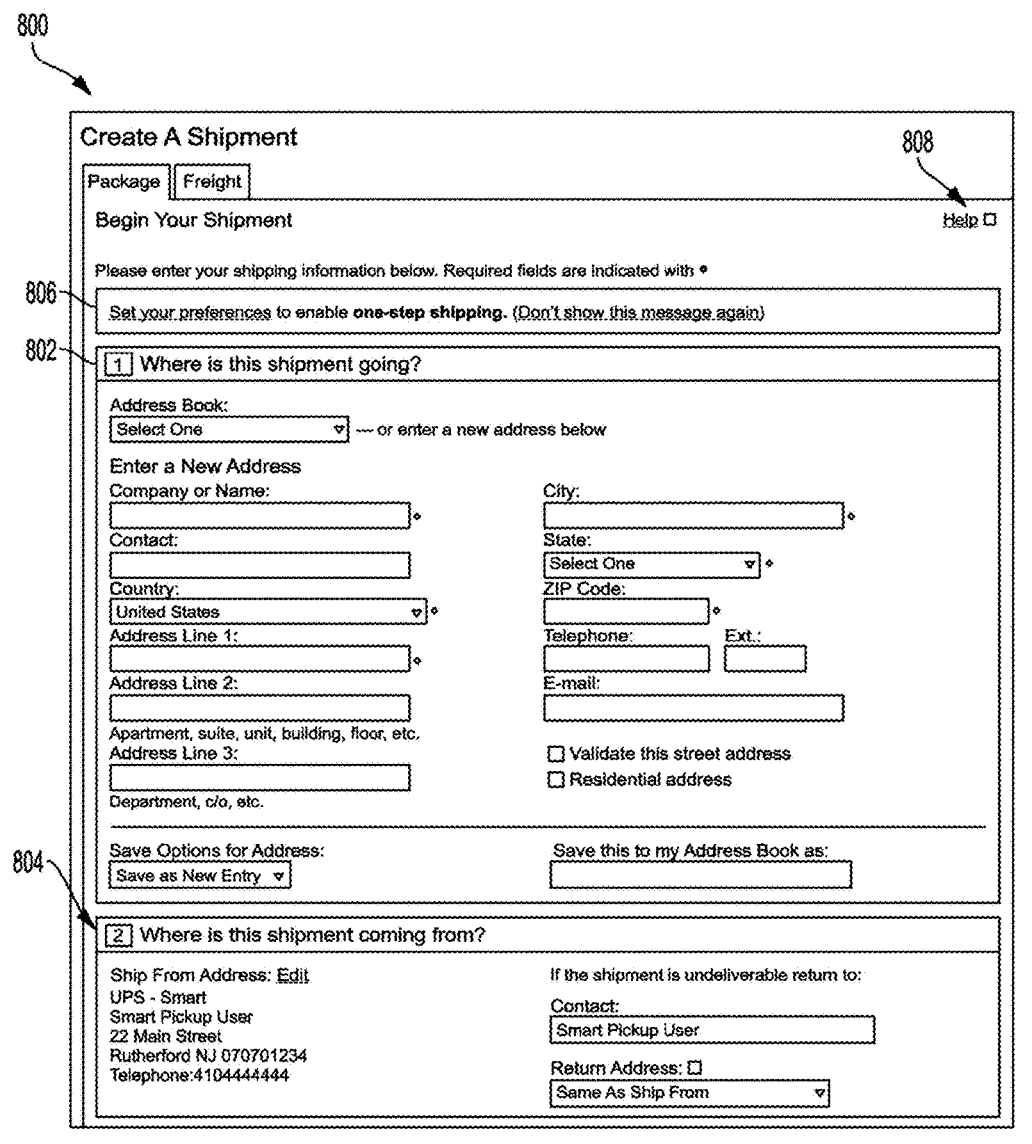

FIGS. 8-16 depict an example user interface for facilitating package shipping and remote access of customer computing entities in a secure environment. In one implementation, user interface element 800, of FIG. 8, is for receiving shipping and/or destination information/data for goods/items to be shipped, is presented to a user. In some implementations, the user is a shipping customer, such as a consignor/shipper, consignee/recipient (both referred to herein interchangeably as customers). In some implementations, the consignor/shipper may provide information/data input at interface element 802. Interface element 802 may be for receiving shipping address information/data. For example, the user may provide textual information/data indicating the shipping address of goods/items to be shipped. User interface element 802 may facilitate shipping multiple packages to one or more addresses. The user may select to save addresses frequently used. The user may then select a saved address at a later time and/or date to automatically populate interface element 802 with the information/data associated with the saved address. As will be recognized, a variety of other approaches and techniques can be used to adapt to various needs and circumstances.

Similarly, the user may provide information/data indicating the consignor/shipper address using interface element 804. Again, the user may select a saved address to populate interface element 804. The user may opt-in to enable one-step shipping. For example, the one-step shipping may automatically populate user interface elements 802 and 804 with information/data pre-specified by the user. Additionally, the user may utilize user interface element 800 to select a type of shipping for a package. For example, the user may select to ship the package using a freight service or a package service. In one implementation, the freight service may utilize ground transportation for shipping, while the package service utilizes air transportation for shipping. However, any types of delivery service levels can be used. Such deliver service levels include Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. Finally, user interface element 800 may include a "help" user interface element 808. Interaction with user interface element 808 may provide information/data associated with using particular functions of user interface element 800. For example, interaction with user interface element 808 may provide information/data specifying how to set preferences associated with one-step shipping as described above.

In one implementation, a textual information/data entry user interface element 900 for receiving description of goods/items to be shipped is presented to a user (e.g., operating a user computing entity 110). As noted, the user can be a shipping customer, shipping agent, or carrier personnel responsible for overseeing the shipping initiation process. For example, the user may be an agent of the carrier.

In some implementations, the user interface elements can receive a configurable number of characters or letters as a description of the goods/items to be transported by the carrier via the package. For example, the user interface element 900 may be configured to receive a maximum of 255 characters or letters. In some implementations, spaces and other characters may not be counted against the number of maximum characters or letters. In some implementations, other shipping information/data is also entered in user interface element 900. For example, the customer may enter a shipping date for the package prepared for shipping. Similarly, the customer may enter a requested delivery date. Other information/data required for shipping may also be entered using user interface elements of FIGS. 8-16, such as information/data associated with the origin, destination, service level, consignor, consignee, contents, carrier, and/or the like.

In some implementations, the user may provide size and weight information/data for one or more packages containing items/goods to be shipped using user interface element 902 of FIG. 9. The user may select to apply the provided information/data to a plurality of packages. The user may also identify "large packages" or packages that require "additional handling." For example, the user may identify fragile packages. In some implementations, the user may select a method of shipping using user interface element 904. For example the user may select "2nd day air" shipping or "5 business days ground" shipping. Similarly, the user may select to receive an email notification responsive to delivery of the package. The user may also select a variety of additional services available through user interface element 904. For example, the user may select a "cash on delivery" option for payment. Similarly, the user may choose a shipping service that is offered by the carrier to reduce carbon emission. Other services may be offered as shown in FIG. 9.

Figure 10:

In some implementations user interface element 1000 of FIG. 10 may include user interface element 1002 for providing information/data entry fields for receiving user defined reference numbers. For example, the consignor/shipper may be an online sales company that frequently ships items sold online to customers. Such companies often maintain reference numbers that are different from the reference numbers of the carrier. Using user interface element 1002, the reference numbers of the company and the carrier may be correlated. The consignor/shipper may provide payment information/data for processing the shipping of the package via interface element 1004. In some implementations, the consignor/shipper may select payment information/data previously saved via a drop down menu. The consignor/shipper may also provide a promotional code that awards the consignor/shipper discounts for shipping the package. The consignor/shipper may request that the package be picked from a location specified by the consignor/shipper using interface element 1006. Finally, the user may select to review the shipping details before completing the process via user interface element 1008. Alternatively, the user may select not to review the shipping details before completing the process via user interface element 1008. Other user interface elements may be provided to the user. For example, an interface element for initiating an application may be provided. In some implementations, the interface element is displayed in a startup directory. In some implementations, a user interface element may be used to display that a process is running. For example, a task manager interface element may indicate that a shipping application processes are currently active.

With the appropriate information/data input via an interface, the consignor/shipper may be routed to and/or provided with a shipping confirmation page 421 displayed in an HTTPS browser window 430. The shipping confirmation page may be a webpage that summarizes the shipping information/data provided by the consignor/shipper to be used in routing the package in the carrier's transportation and logistics network and generating the shipping label. The shipping confirmation page may be a webpage that summarizes the shipping information/data provided by the consignor/shipper. For example, FIG. 11 depicts user interface element 1100 for selecting items to be printed. User interface element 1100 provides shipment confirmation information/data and printing options. User interface element 1102 displays a summary of the provided shipping information/data (total charge, billing information, delivery data, service type, tracking information, and the like). User interface element 1104 provides interaction elements that allows the user to print items associated with the shipping. In some implementations, user interface element 1104 may provide the user with an option to print shipping labels and/or receipts associated with the shipping. For example, a user may select to print a label using a thermal printer supported by the carrier. User interface element 1106 provides the user with an option to void the shipment. The user may select various items for printing according to data flow 400 described above.

In turn, a bridge page is automatically opened in the browser 431 in an HTTP bridge page window 440. In some embodiments, the HTTP bridge page window 440 is configured to communicate with local application 450 using HTTP and with HTTPS browser window 430 in PostMessage (e.g., PostMessage( ) function). The local application 450 may be an application for providing instructions to a local device (e.g., user computing entity 110). For example, the local application 450 may be an application residing on a user computing entity 110 of the consignor/shipper for accessing and providing instructions to a printer. PostMessage is an Application Program Interface (API) of HTML5 that enables cross-origin or cross-domain communication. As will be recognized, HTML5 is a core technology markup language used for structuring and presenting content over the internet according to the fifth revision of the HTML standard. In other words, an API is a set of routines, protocols, and/or tools for building and customizing software applications. As described above, PostMessage can be an HTML5 API that allows for sending information/data messages between two windows/frames belonging to different domains. For example, a window displaying a webpage belonging to the carrier domain can send and receive information/data to and from a window displaying a page belonging to the consignor/shipper domain. This feature allows for communication between the HTTPS browser window 430 and HTTP bridge page 440, even if the browser does not support external, non-secure or non-encrypted connections and/or protocols. It should be understood that other functions or algorithms that facilitate communication between a secure domain and a non-secure local host domain may be used.

The process above may continue with the HTTP bridge page window 440 providing an HTTP print request 441 to local application 450. In turn, the local application 450 may provide an HTTP "ok to print" return 442 to HTTP bridge page window 440. Similarly, the local application 450 may provide an HTTP "deny print" return. The process then may continue with the HTTP bridge page window 440 providing the "ok to print" return 432 to HTTPS browser window 430 using PostMessage. In turn, the HTTPS browser window generates a print request event 422. The print request event may then be transmitted to the internet shipping web application 420 using HTTPS or other secure and/or encrypted protocols. In turn, the internet shipping application provides a label request 411 to label generator server 410. In some implementations, the label generator server 410 is operated by the carrier. In other implementations, the label generator server 410 can be operated by a retailer or other third party. In some implementations, the label request includes shipping information/data provided by the consignor/shipper as discussed above and/or other information/data. In some implementations, the label request includes shipping information/data associated with the package to be shipped, the size of the package, the size of the label, the origin, the destination, and/or printer information/data. For example, the printer information/data may include the type, make, and/or model of the consignor/shipper printer and/or a variety of other information/data.

The label generator server 410 may generate printer command language (PCL) printing instructions for the consignor/shipper printer (e.g., ZPL, EPL2, SPL, and/or the like). In some implementations, the shipping instructions may include information/data specifying information/data (text, barcodes, color, and/or the like) for printing on labels, labels sizes, number of labels to be printed, font size, positioning of elements, label page breaks and/or instructions specific to the type of printer. The PCL instructions 412 are, in turn, provided to the internet shipping web application 420. In some implementations, the PCL instructions are provided to the Internet shipping application in their native format. The PCL instructions are then transmitted 423 to the HTTPS browser window 430 using, for example, HTTPS.

The PCL instructions are then transferred from the HTTPS browser window 430 to the HTTP bridge page window 440. In turn, the PCL instructions 443 are provided to local application 450 using, for example, HTTP. Finally, the PCL instructions are provided in their native format 451 to a printer 460. The printer may be, for example, a thermal printer and/or any other type of printer. In some implementations, the thermal printer 460 is replaced with other types of printers (e.g., laser, ink jet). In some implementations, the printer 460 may replace with other devices such as a scanner. The information/data flow described above may be altered to accommodate different devices, however, the information/data flow would be generally similar to the described above. Additionally, applications other than internet shipping may be used with processes similar to the processes above. For example, customer solutions applications may be used with processes similar to the above. In some implementations, Customer Order Processing System (COPS), Enterprise CampusShip (ECS), and Retail Application (REAP) may be used with processes similar to the above. For example, the internet shipping application may be replaced with COPS, ECS, and/or REAP. COPS may be a global printing application for Return Services, PAC Return Services, customs invoice, delivery change requests, damage call tags, non-ODS pickups and drop-offs. ECS may be an Internet-based shipping application, which allows for registered, logged-in users to generate valid shipping labels using the Internet. ECS can also be limited dynamically based on a given shipper's assigned privileges. In some implementations, it may provide consumers with the ability to view historical data associated with shipments. REAP may be a web and a terminal application that provides a carrier's access point (AP) operator with means to manage their AP and their package inventory. For example, the carrier AP operator may view packages that are inbound, currently at the AP, and/or packages that need to be prepared for return to the carrier. REAP may also allow the carrier to scan and upload package information and/or allow consignees to collect their packages.

Figure 12:
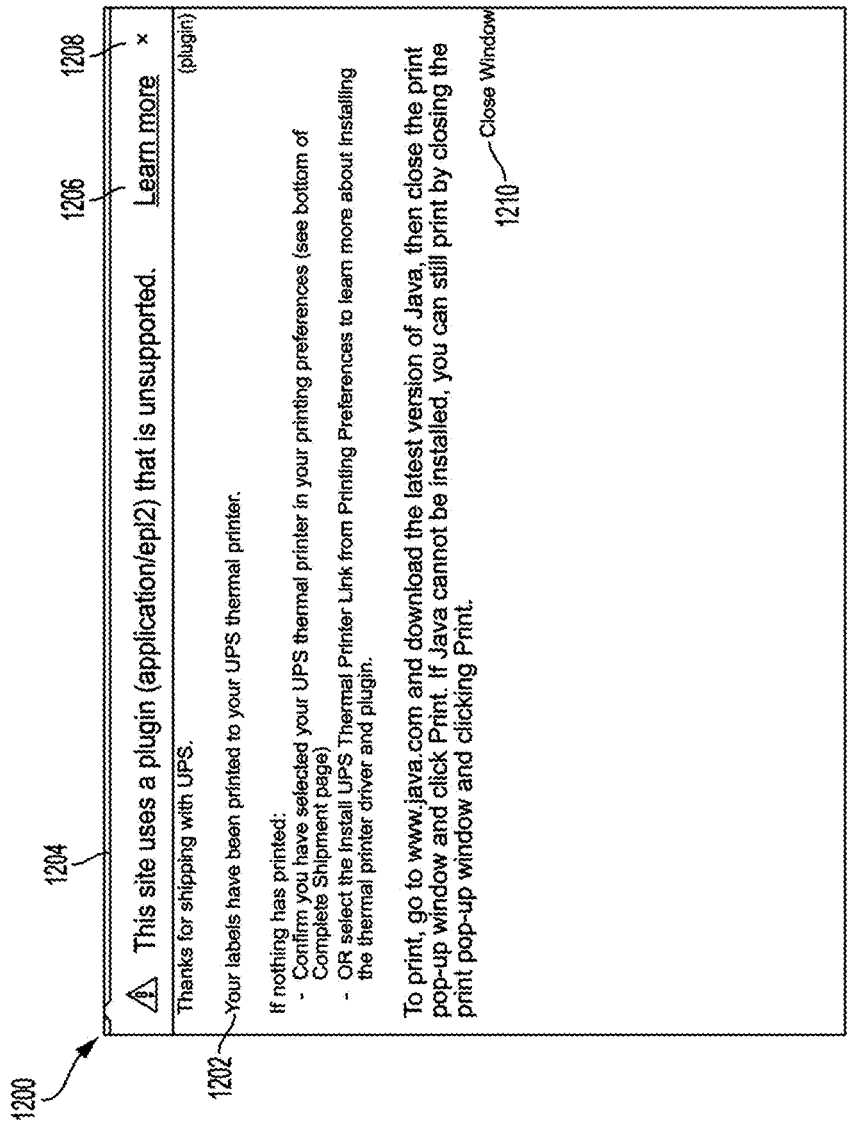

The user interface for facilitating package shipping and remote access of consignor/shipper devices in a secure environment may variously include user interface elements for displaying various warnings, confirmations and instructions. For example, user interface element 1200, of FIG. 12, provides printing confirmation information/data 1202. In some implementations, user interface element 1200 includes window 1204. In other implementations, window 1204 is overlaid on top of user interface element 1200 by an operating system running on the customer computing entity. In some implementations, window 1204 may display a user interface element 1206 for receiving user selections. In some implementations, interaction with interface element 1206 may provide information associated with a third-party application and/or protocol (e.g., plugin). In some implementations, interaction with interface element 1206 may allow running of a third-party application and/or protocol. In some implementations, the third-party application and/or protocol may be installed at the customer computing entity and/or the carrier computing entity. In some implementations, the install is silent. For example, the installation process may run in the background without displaying indications to the user. The application and/or protocol may facilitate remote access of a printer, such as a thermal printer 460. For example, the application and/or protocol may allow the carrier to access a consignor/shipper printer in order to print labels and receipts. In some implementations, interacting with user interface element 1208 may minimize window 1204 such that information/data from user interface element 1202 is displayed un-obstructed. Similarly, interacting with user interface element 1210 may minimize and/or close window 1200.

Figure 13:
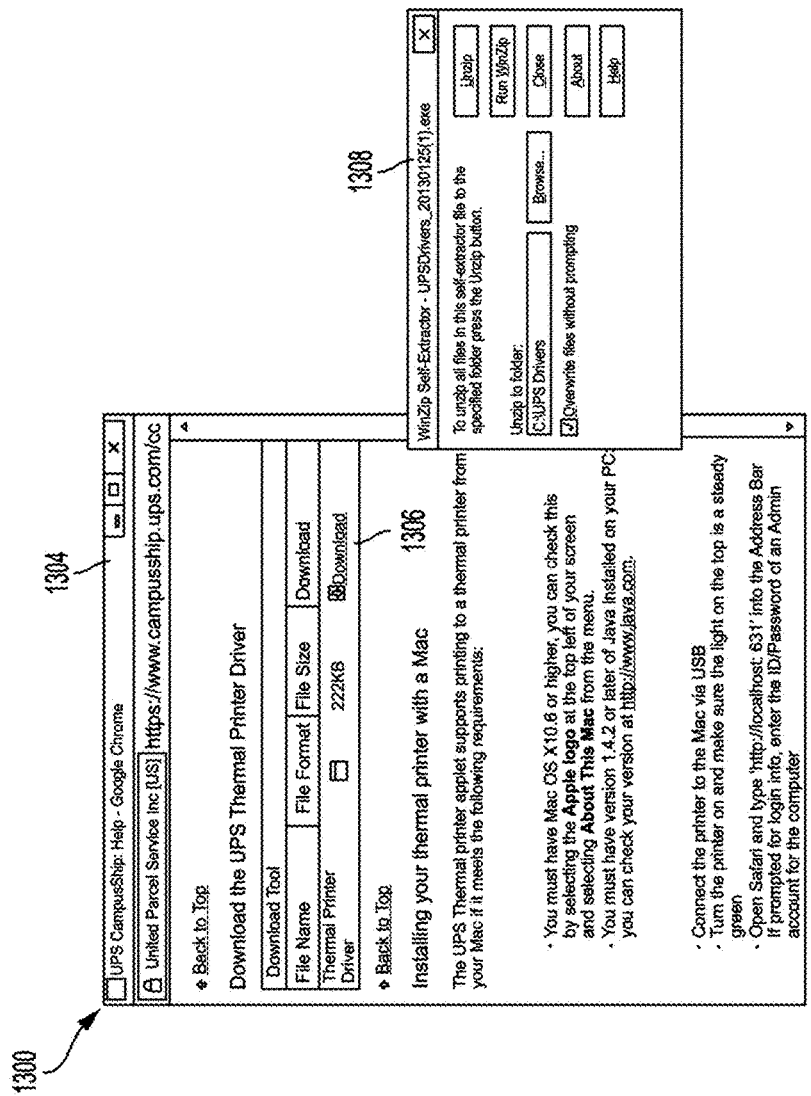

Similarly, user interface element 1300 of FIG. 13 may provide any of the information/data described above (e.g., user interface elements 900-1200). In some implementations, user interface element 1300 includes window 1304. In other implementations, window 1304 is overlaid on top of user interface element 1300 by an operating system running on the customer computing entity. In some implementations, window 1304 may display a user interface element 1306 for receiving user selections. Interaction with interface element 1306 may initiate installation of software required for facilitating access of a user device remotely. For example, the interaction with user interface element 1306 may initiate installation of thermal printer driver for a user's thermal printer. In some implementations, the installation process may result in a second pop-up window 1308. For example, the window 1308 may be for uncompressing compressed files required for the installation. In some implementations, the window 1308 may include interaction elements for minimizing the window, uncompressing the files, and providing additional information associated with the compressed files. In some implementations, user interface element 1300 may include interaction elements, for example, for installing additional and/or new printers, and for printing a sample label, once a new printer is installed. In some implementations, the installation is silent. For example, drivers for printers may be installed without any display being provided to the user during the installation process. As described, the windows 1304 and 1308 may be minimized such that information/data from user interface element 1300 is displayed un-obstructed.

Figure 14:
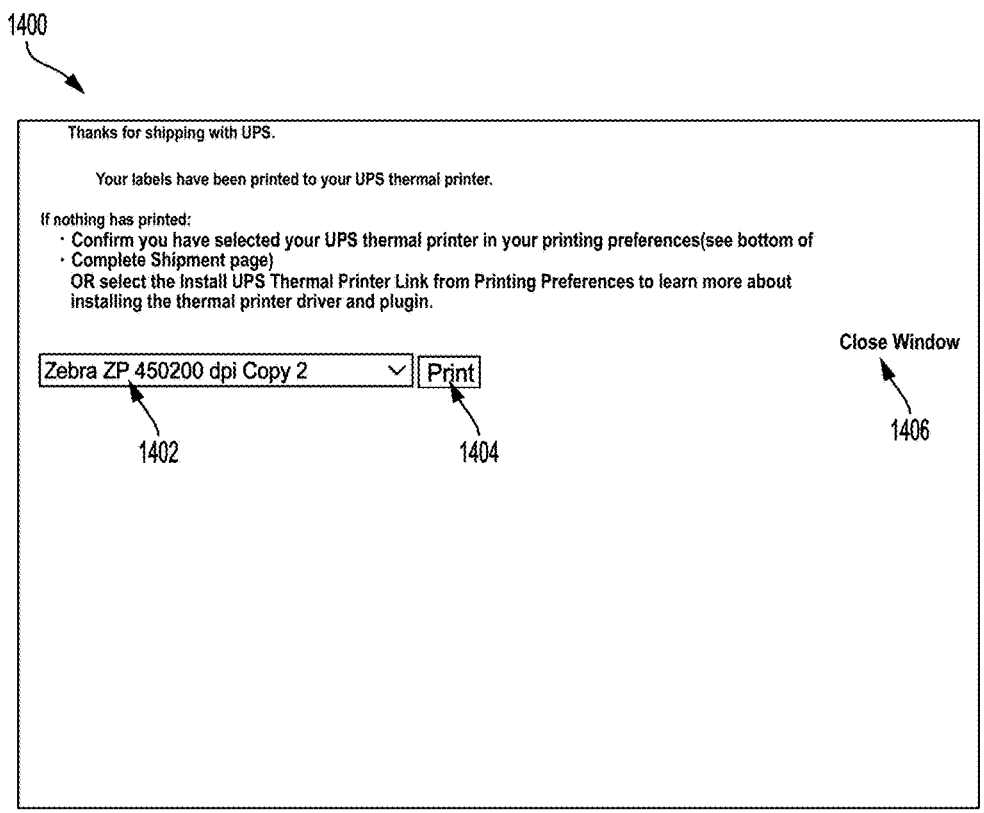

User interface element 1400, of FIG. 14, may provide a list of printers available for selection and allow for installation of drivers required for using the selected printers. For example, user interface element 1402 may be a drop down menu that displays supported printers. In some implementations, when a user selects a printer with previously installed drivers, labels can be directly printed. In some implementations, when a user selects a printer lacking a required driver, a pop-up window may be presented to the user for facilitating installation of the required driver. In some implementations, user interface element 1404 can confirm printing. In some implementations, user interface element 1406 can terminate the printing process and minimize user interface element 1400.

Figure 15:
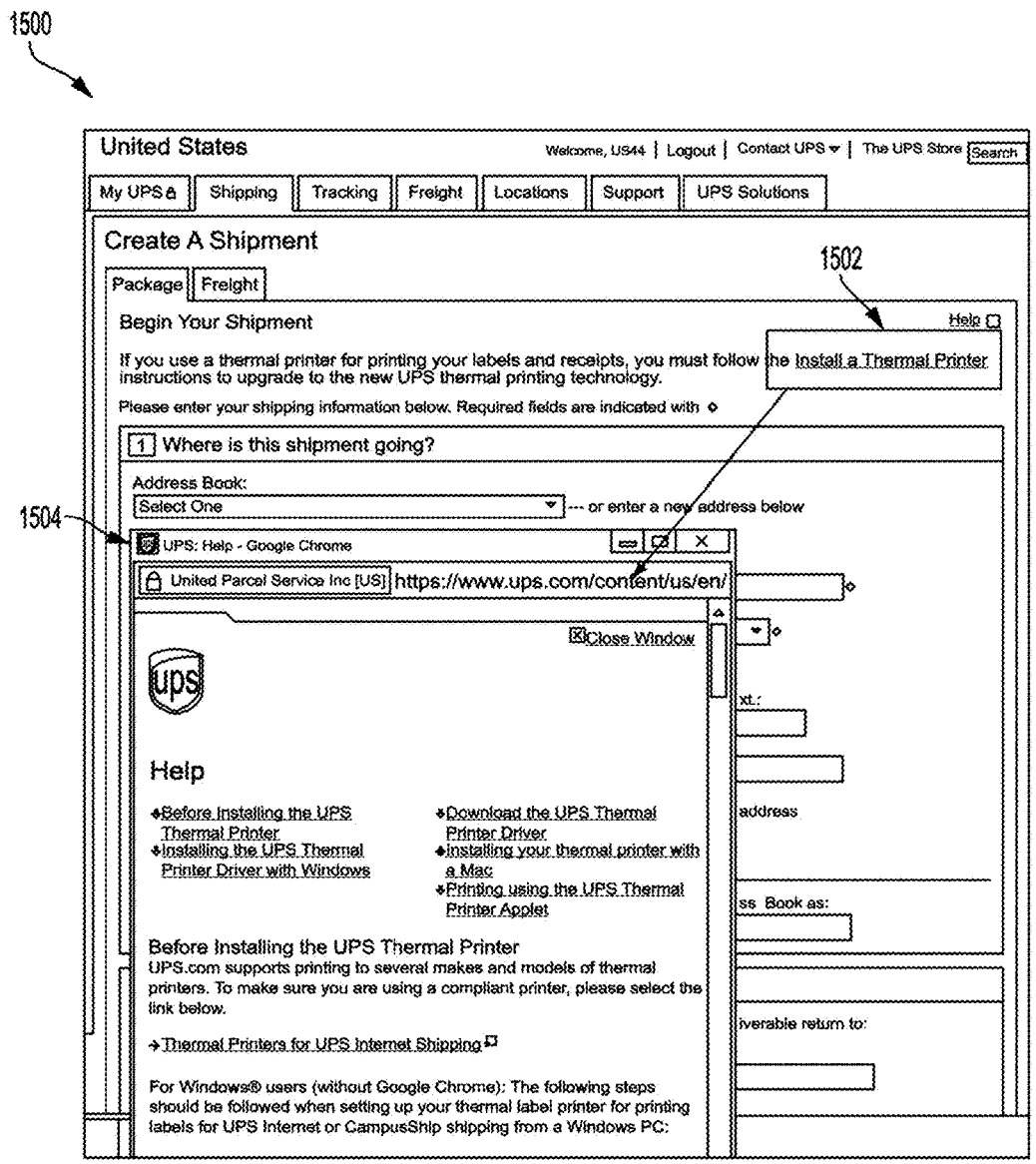

FIG. 15 depicts user interface element 1500 which is generally similar to user interface element 800. In some implementations, user interface element 1500 may include user interface element 1502 for installing a particular user computing entity. For example, user interface element 1502 may initiate installation of a consignor/shipper thermal printer. In some implementations, the user interface element 1502 is displayed only when a new device is available for installation. For example, the user interface element 1502 may be displayed in response to connecting a new thermal printer to a device accessing the user interface above. Interaction with user interface element 1502 may display user interface element 1504. In some implementations, user interface element 1504 is part of user interface element 1500. In some implementations, user interface element 1504 is a pop-up window that is activated in response to interactions with user interface element 1502. User interface element 1504 may include a plurality of links and/or additional user interface elements. For example, user interface element

1504 may include links to install specific device drivers. Similarly, user interface element 1504 may include links to webpages providing instructions related to installation of various supported devices. In some implementations, different drivers and/or software is available for installation based on, for example, the type of browser used and/or the type of operating system used. In some implementations, the user can dismiss or minimize user interface element 1504.

Figure 16:
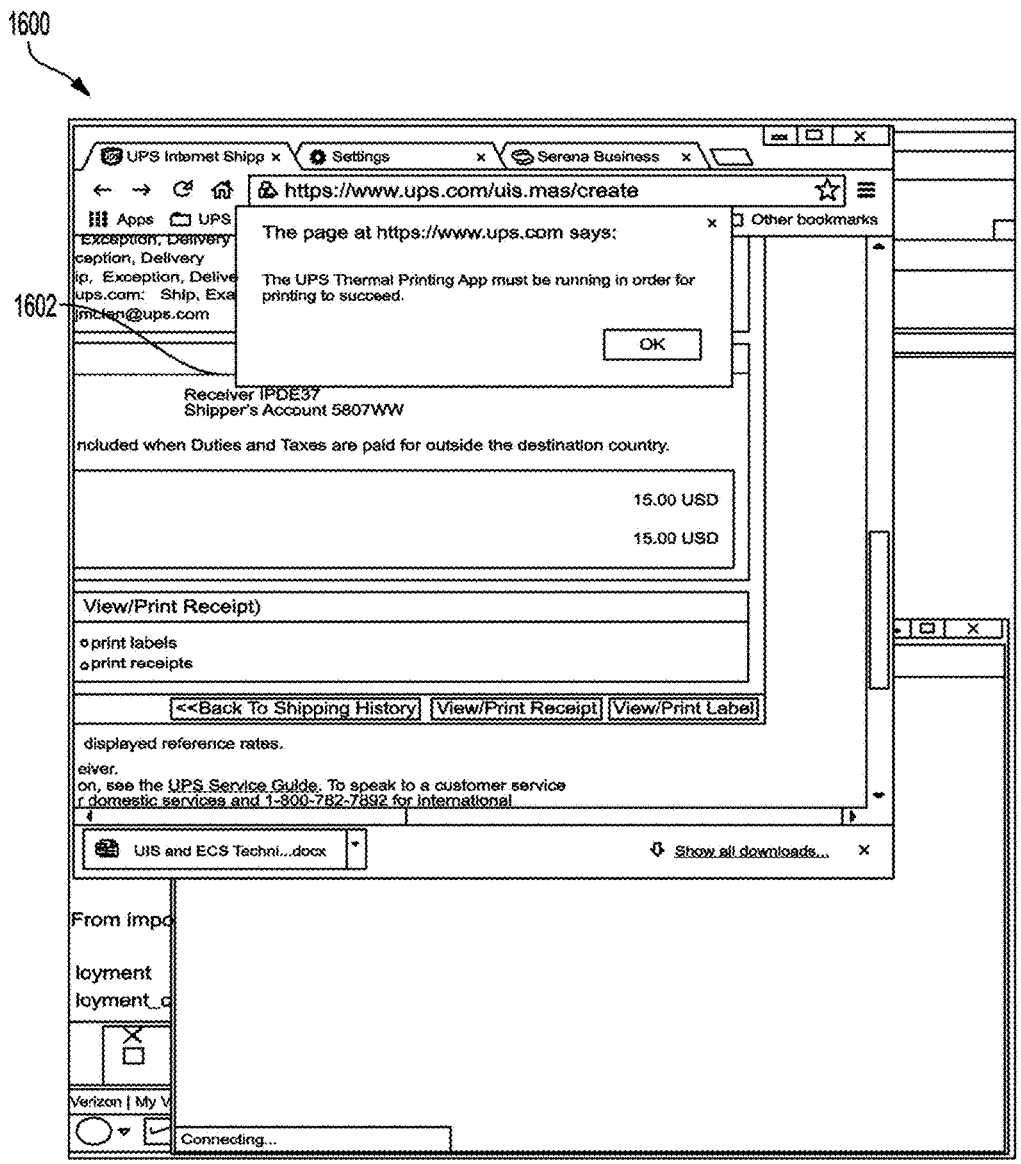

User interface element 1600, of FIG. 16, may include user interface element 1602 for providing warnings and/or messages. For example, user interface element 1602 may provide a warning to a user specifying that an application must be running in order for printing to succeed. In some implementations, such warnings are only provided in response to detecting that printing failed. In some implementations, user interface element 1602 is part of user interface element 1600. In some implementations, user interface element 1602 is a pop-up window that is activated in response to interactions with user interface element 1602. In some implementations, the user can dismiss or minimize user interface element 1602. In some implementations, user interface element 1602 may provide the user with additional user interface elements or links associated with resolving a problem preventing printing.

b. Example 2

Figure 5:
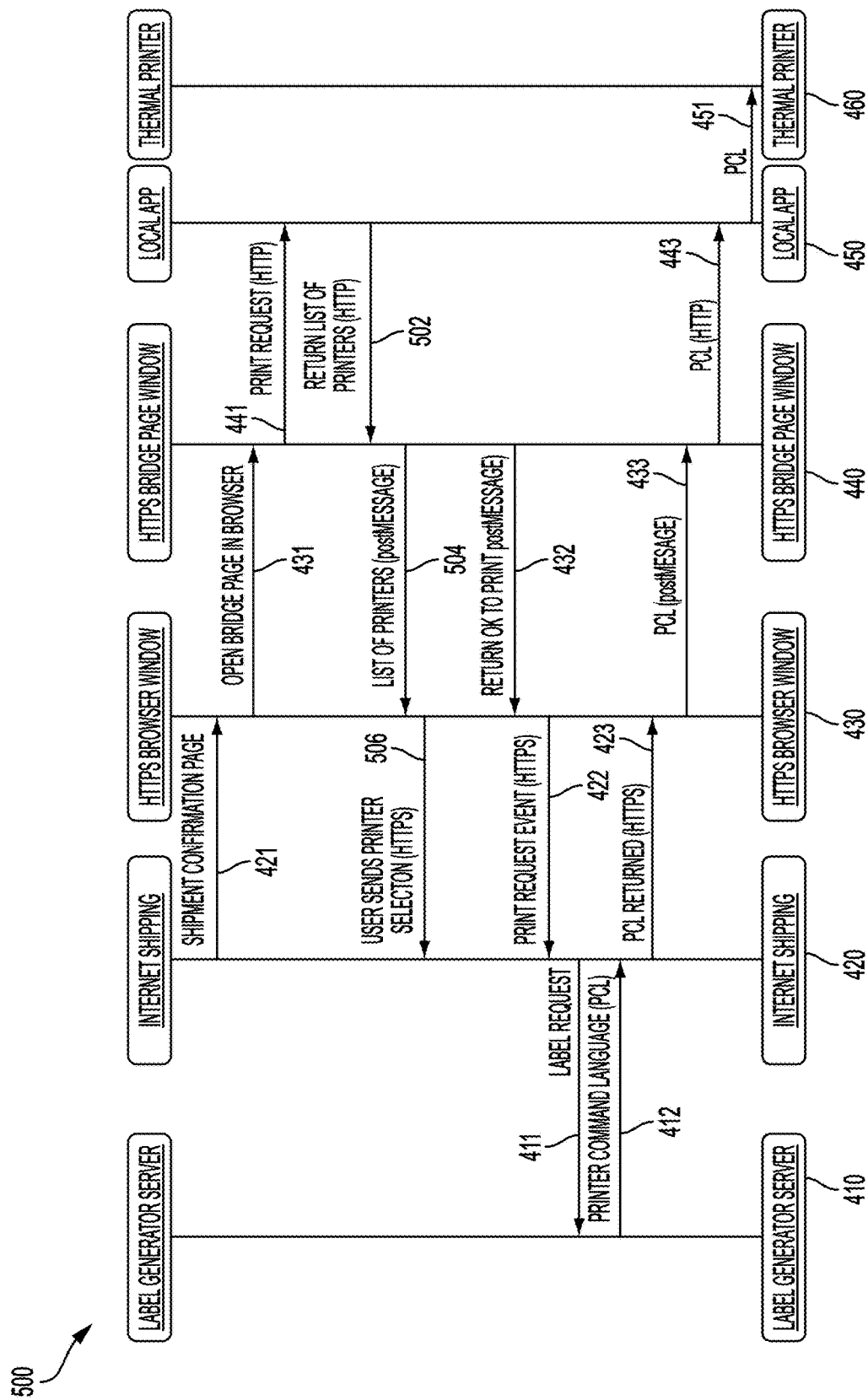

Similar to FIG. 4, FIG. 5 is an information/data flow diagram for printing shipping labels using a highly secure browser. However, the information/data flow of FIG. 5 allows for user selection of a printer from a plurality of printers available to the user. In some implementations, the process for printing a shipping label may begin with a consignor/shipper accessing a carrier's web application for shipping to provide shipping information/data that can be used to generate a label. For example, the consignor/shipper may access internet shipping web application 420 to provide shipping information/data. In some embodiments, the consignor/shipper may be provided with a user interface for providing shipping information/data. For example, a user (e.g., operating a user computing entity 110) may be prompted by the web application to provide origin address information/data, destination address information/data, information/data regarding the contents of the package, payment information/data, and/or the like. See FIGS. 8-16 described previously.

In turn, the consignor/shipper may be routed to and/or provided with a shipping confirmation page 421 displayed in an HTTPS browser window 430. See FIG. 11 described previously. As noted, the shipping confirmation page may be a webpage that summarizes the shipping information/data provided by the consignor/shipper to be used in routing the package in the carrier's transportation and logistics network and generating the shipping label. In turn, a bridge page is automatically opened in the browser 431 in HTTP bridge page window 440. In some embodiments, the HTTP bridge page window is configured to communicate with local application 450 using HTTP and with HTTPS browser window 430 in PostMessage.

The process above may continue with the HTTP bridge page window 440 providing an HTTP print request 441 to local application 450. In turn, the local application 450 may provide a list of available printers using 502, for example, HTTP that are available to local application 450. The process may also provide an HTTP "ok to print" return (not shown) as described above. The process then may continue with the HTTP bridge page window 440 providing the list of printers 504 to HTTPS browser window 430 using a PostMessage. In turn, the user (e.g., operating a user computing entity 110) may select a printer using the HTTPS browser window 430. The printer selection 506 is then transferred from the HTTPS browser window 430 to the internet shipping application 420 using HTTPS. User interface element 1400 may be used to facilitate the user selection as shown in FIG. 14.

The process then may continue with the HTTP bridge page window 440 providing the "ok to print" return 432 to HTTPS browser window 430 using PostMessage. In turn, the HTTPS browser window generates a print request event 422. The print request event may then be transmitted to the internet shipping web application 420 using HTTPS or other secure and/or encrypted protocols. In some implementations, the print request may identify one or more printers selected by the user for printing the shipping label. In some implementations, the request may identify, for example, the type of printer selected, the make and model, and/or other requirements specific to the selected printer. For example, the request may identify the printer's native language, customization option, and/or formatting specifications.

In turn, the internet shipping application 420 provides a label request 411 to label generator server 410. As noted, the label generator server 410 can be operated by the carrier. In other implementations, the label generator server 410 can be operated by a retailer or other third party. In some implementations, the label request includes shipping information/data provided by the consignor/shipper as discussed above and/or other information/data. In some implementations, the label request includes shipping information/data associated with the package to be shipped, the size of the package, the size of the label, the origin, the destination, and/or printer information/data. For example, the printer information/data may include the type, make, and/or model of the consignor/shipper printer and/or a variety of other information/data.

The label generator server 410 may generate PCL printing instructions customized for the selected consignor/shipper printer. In some implementations, the shipping instructions may include information/data specifying information/data (text, barcodes, color, and/or the like) for printing on labels, labels sizes, number of labels to be printed, and/or instructions specific to the type of printer. The PCL instructions 412 are, in turn, provided to the internet shipping web application 420. In some implementations, the PCL instructions are provided to the internet shipping application 420 in their native format. The PCL instructions are then transmitted 423 to the HTTPS browser window 430 using, for example, HTTPS. The PCL instructions are then transferred from the HTTPS browser window 430 to HTTP bridge page window 440. In turn, the PCL instructions 443 are provided to local application 450 using, for example, HTTP. Finally, the PCL instructions are provided in their native format 451 to, for example, the selected thermal printer 460. In some implementations, multiple printers of the consignor/shipper may receive instructions simultaneously. For example, facilities shipping large quantities of packages may use a similar information/data flow to route information/data to multiple printers simultaneously. In some implementations, the thermal printer 460 may be used simultaneously with other types of printers (e.g., laser, ink jet). In some implementations, the printer 460 may be used simultaneously with other devices such as scanners. The information/data flow described above may be altered to accommodate multiple different devices simultaneously, however, the information/data flow would be generally similar to the described above.

c. Example 3

Figure 6A:
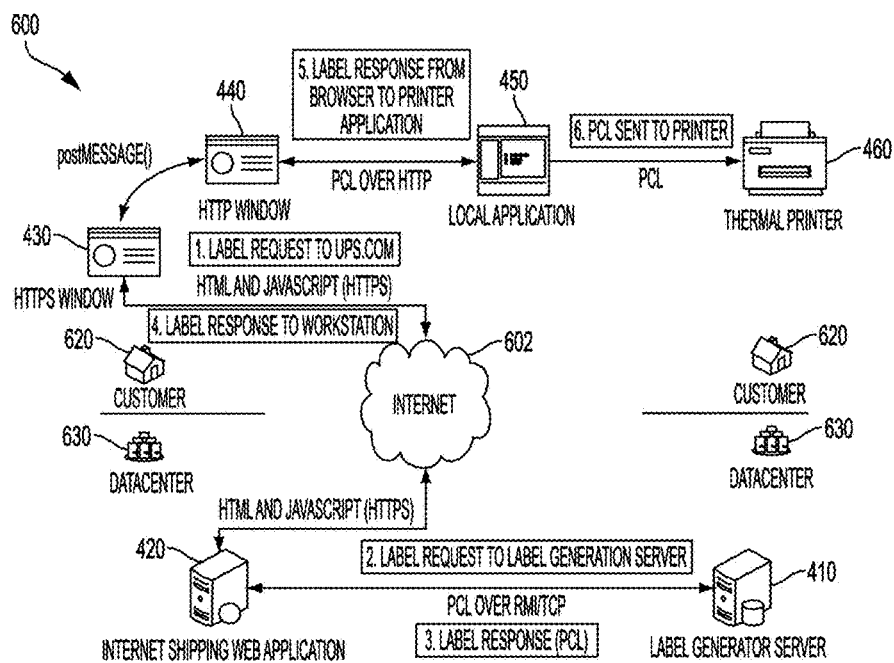

FIG. 6A includes an information/data flow diagram illustrating exemplary information/data flows between various devices of a datacenter and customers. FIG. 6A provides an illustration of one exemplary information/data flow for the present invention. As shown in FIG. 6A, this particular embodiment may include one or more carrier computing entities (e.g., datacenter) 630, one or more networks (e.g., Internet) 602, and one or more user computing entities (customer) 620.

In some implementations, the information/data flow of FIG. 6A may begin with a customer 620 opening an HTTPS window 430 and providing a label print request to datacenter 630. The customer 620 may provide, for example, shipping information using a user interface for shipping. See FIG. 8-16 previously described. In some implementations, the request may be an HTML and JavaScript request transferred using HTTPS protocol. The request may be transferred from HTTPS window 430 to internet shipping web application 420. Once the request is received at the internet shipping web application 420, a label request is provided to label generator server 410. In some implementations, the label request to server generator server 410 is transmitted using PCL over remote method invocation transmission control protocol (RMI/TCP). Similarly label generator server 410 may return a label response to internet shipping web application 420 using PCL over RMI/TCP. In turn, the label response is transferred from internet shipping application 420 to HTTPS window 430 through the internet 602. The return may be an HTML and JavaScript return transferred using HTTPS protocol. Java RMI is a Java API object-oriented programming in which objects on different computers or domains can interact in a distributed network. For example, RMI allows an object running in a first computer to invoke methods on an object running on a different second computer. TCP is a protocol, well known in the art, for enabling two hosts to establish a connections and exchange packets of information/data. In some implementations, RMI may be transferred over other lower level protocols.

On the customer side 620, communication is established between HTTPS window 430 and HTTP window 440 using, for example, PostMessage. The label request return may be transferred to HTTP window 440 in a similar manner. In turn, HTTP window 440 may provide a label response to local application 450 using an HTTP protocol. For example, HTTP window 440 may provide the label response to local application 450 using PCL over HTTP. The local application 450 may be, for example, a standalone Java application. A standalone application may be a software application that is able to operate independent of other software and hardware. Finally, the local application 450 may provide instructions to a customer 620 device. For example, the local application 450 may provide instructions to thermal printer 460 in the thermal printer's native command language. For example, the local application 450 may provide PCL instructions to thermal printer 460. These instructions may cause the printer to print a shipping label according to the specifications of the customer (consignor/shipper) and the requirements of the carrier.

Figure 6B:
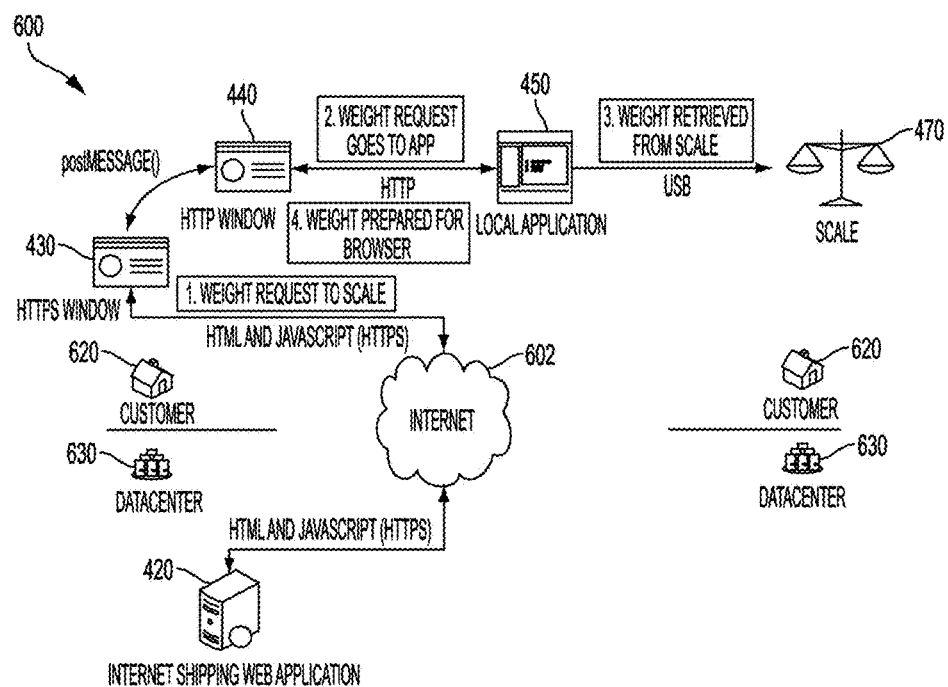

FIG. 6B is generally similar to FIG. 6A but directed toward facilitating remote access of a scale. FIG. 6B provides an illustration of one exemplary information/data flow for the present invention. As shown in FIG. 6B, this particular embodiment may include one or more carrier computing entities (e.g., datacenter) 630, one or more networks (e.g., Internet) 602, and one or more user computing entities (customer) 620.

In some implementations, the information/data flow of FIG. 6B may begin with a customer 620 opening an HTTPS window 430 and providing a weight request to HTTP window 440 using, for example, PostMessage. In turn, the request may be provided by HTTP window 440 to local application 450 using an HTTP protocol. The local application may then provide the request to scale 470 using, for example, a USB protocol. In turn, the scale 470 may return weight information/data to local application 450 via a USB protocol. The local application 450 returns the weight information/data to HTTP 440 using an HTTP protocol. Finally, the weight information/data is transferred from HTTP window 440 to HTTPS window 430 using, for example, PostMessage. In turn, the weight information may be displayed in a secure web browser at the consumer device. In some implementations, the weight/data information may be displayed in a user interface element. In some implementations, the weight information/data is transferred to datacenter 630. For example, the weight information/data may be transferred to internet shipping application 420. In some implementations, the datacenter 630 may process the weight information and return pricing data to HTTPS window 430 for display at the consumer device 620. For example, the internet shipping application 420 may determine a consumer charge based on the weight information/data received. The charge may then be returned to the consumer device for display. In some implementations, interface elements displayed at HTTPS window 430 may facilitate receiving payments, based on the charge, from the consumer.

2. Exemplary Process for Allowing a Carrier Access to Access Consignor/Shipper Computing Entity in a Secure Environment a. Example 1

FIG. 7A is a flow chart of an example process 700a for allowing a carrier computing entity 100 access to a consignor/shipper computing entity (e.g., user computing entity 110) in a secure environment. The process 700a may be used to allow a carrier computing entity 100 access to a consignor/shipper computing entity (e.g., the user's printer). For example, the process 700a may allow a carrier computing entity 100 to provide direct commands, for printing a shipping label, to a consignor/shipper thermal printer. This allows the carrier to directly customize the shipping labels according to the carrier's rules and requirements. For example, the carrier may customize the print colors and the size of the label.

The process 700a begins with providing, by a first user computer entity and through a first window displaying a first webpage in a browser, a request for instruction for a particular device, the instructions being in a native command language of the particular device, wherein the request is provided over a first secure encrypted connection using a first protocol (702). For example, the consignor/shipper may access a webpage or a web application of the carrier, through a window in a browser over a secure and/or encrypted connection. In some implementations, the secure and/or encrypted connection may be over HTTPS. The user may provide information/data associated with the shipping of a package through the browser window. For example, the user may provide information/data related to the origin address, destination address, the contents of the package, and/or payment for the same. In some implementations, the webpage and/or the web application are hosted by servers of the carrier. The information may be provided using user interface element 800 as shown in FIG. 8 and described above.

The process 700a continues with receiving, by the first user computer entity from a web application, the instructions, the instructions being received over the first secure encrypted connection using the first protocol (704). For example, instructions for a thermal printer may be received over HTTPS. In some implementations, the provided instructions are based on a combination of the information/data provided by the consignor/shipper and information/data provided by servers of the carrier.

The process 700a continues with initiating a bridge webpage, the bridge webpage being initiated in a second window in the browser, wherein the first window and the second window are in communication, and wherein the first page belongs to a first domain different from a second domain to which the second page belongs (706). For example, the process 700a may continue with the first user computer entity generating a bridge webpage in a second window of the browser, different from the first window. In some implementations, the second window is in communication with the first window via PostMessage, as described above. In some implementations, the first webpage belongs to a first domain different from a second domain to which the second webpage belongs. For example, the first webpage may belong to the carrier's domain while the second page belongs to the consignor/shipper domain. In turn, the process 700a continues with the first user computer entity, receiving at the second window from the first window, information/data including the instructions (708). For example, the instructions for the printer may be transferred from the first window to the second window.

The process 700a continues with providing, by the second window, the instructions to an application for controlling the first device, the information/data being provided over an un-secure non-encrypted connection using a second protocol (710). For example, the application for controlling the first device may be a local application 450 for controlling a thermal printer. In some implementations, instructions may be transferred from the second window to the local application information/data including instructions over HTTP. Finally, the process 700a provides the instructions in the native command language of the particular device to the particular device (712). For example, the local application 450 may provide to the thermal printer PCL instructions based on the information/data received at the local application 450. In some implementations, the instructions may cause the thermal printer to print one or more labels according to the information/data provided by the consignor/shipper and information/data associated with the carrier's rules and requirements. In some implementations, shipping web application described above may utilize a user interface for facilitating package shipping and remote access of customer computing entities in a secure environment. The user interface is described in more detail in the following section.

b. Example 2

FIG. 7B is a flow chart of an example process 700b for allowing a carrier computing entity 100 access to a consignor/shipper computing entity (e.g., user computing entity 110) in a secure environment. The process 700b may be used to allow a carrier computing entity 100 access to a consignor/shipper computing entity (e.g., user computing entity 110). For example, the process 700b may allow a carrier computing entity 100 to provide direct commands, for printing a shipping label, to a consignor/shipper thermal printer. As described above, this process allows the carrier to directly customize the shipping labels according to the carrier's rules and requirements.

The process 700b begins with receiving, at a web application belonging to a first domain, a request for instructions for a particular device belonging to a second domain, the instructions being in a native command language of the particular device, wherein the request is provided over a first secure encrypted connection using a first protocol (752). For example, the web application belonging to the carrier's domain may receive a request for instructions for a thermal printer belonging to the consignor/shipper domain. In some implementations, the request may be provided over a first secure encrypted connection using a first protocol. For example, the request may be provided over an encrypted connecting over HTTPS. The process 700b continues with providing, by the web application to a server, the request for instructions over a connection using a second protocol (754). In some implementations, the web application is a carrier's web application for facilitating shipping of packages. In some implementations, the server is a label generation server belonging to the publisher domain. In some implementations, the web application may provide the request for instruction over RMI/TCP.

In turn, the process 700b provides information/data comprising the instructions over the connection using the second protocol, responsive to receiving the request at the server (756). For example, the label generation server may provide PCL thermal printer instructions over RMI/TCP. The instructions may include information/data associated with sizing, coloring, and text associated with a label to be printed. Finally, the process 700b provides, to a first user computing entity, the instructions over the first secure encrypted connection using the first protocol (758). For example, the internet shipping application may provide to the consignor/shipper computing entity (e.g., user computing entity 110) the PCL instructions over HTTPS. In some implementations, the process 700a may be combined with the process 700b. In some implementations, elements of the process 700a may be combined with elements of the process 700b. In some implementations, the processes above may be performed by a native application operation on a mobile platform.

Similar processes may be used for different devices. For example, processes similar to the above may be used to facilitate remote access of other devices in a secure environment. For example, processes similar to the above may be used to facilitate remote access of scanners, cameras, photo scanners, barcode scanners and/or the like. It should be understood that the references to printers and/or thermal printers above are exemplary.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer implemented method, operated via a computer memory, comprising:

receiving via a first encrypted connection using a first protocol, at a computing device running an application belonging to a first domain, cross-domain communication comprising a request for instructions for a peripheral device belonging to a second domain distinct from the first domain, the instructions comprising instructions for printing that include a native command language of the peripheral device, wherein the peripheral device is connected to a user computing entity and comprises a printer, scanner or a scale;

providing, from the application to a server outside of the second domain, the request for instructions over a second connection using a second protocol, wherein the server is located in a third domain distinct from the first and second domain, the first protocol is Hyper Text Transfer Protocol Secure and the second protocol is a remote method invocation (RMI);

responsive to receiving the request at the server, providing, from the server to the application, shipping or labeling information comprising the instructions over the second connection using the second protocol; and providing, to the user computing entity, the shipping or labeling information comprising the instructions over the first encrypted connection using the first protocol for facilitating package shipping and remote control of the peripheral device.

2. The computer implemented method of claim 1, wherein the peripheral device is connected to the user computing entity via a wired or wireless network.

3. The computer implemented method of claim 1, wherein the computing device is a web server, and the application is a web application at the web server.

4. A system, comprising:

a data processing apparatus; and a computer memory apparatus in data communication with the data processing apparatus and storing instructions executable by the data processing apparatus and that upon such execution cause the data processing apparatus to perform operations comprising:

receiving via a first secure encrypted connection using a first protocol, at a computing device running an application belonging to a first domain, cross-domain communication comprising a request for instructions for a peripheral device belonging to a second domain distinct from the first domain, the instructions comprising instructions for printing that include a native command language of the peripheral device, wherein the peripheral device connected to a user computing entity and comprises a printer, scanner or a scale;

providing, to a server outside of the second domain, the request for instructions over a connection using a second protocol, wherein the server is located in a third domain distinct from the first and second domain, the first protocol is Hyper Text Transfer Protocol Secure (HTTPS) and the second protocol is a remote method invocation (RMI);

responsive to receiving the request at the server, providing, from the server o the application, shipping or labeling information comprising the instructions over the connection using the second protocol; and providing, to the user computing entity, the shipping or labeling information comprising the instructions over the first secure encrypted connection using the first protocol for facilitating package shipping and remote control of the peripheral device.

5. The system of claim 4, wherein the computing device is a web server, and the application is a web application at the web server.

6. A computer program product comprising at least one non-transitory computer-readable storage medium having computer-readable program code portions stored therein, the computer-readable program code portions comprising:

receiving via a first secure encrypted connection using a first protocol, at a computing device running an application belonging to a first domain, cross-domain communication comprising a request for instructions for a peripheral device belonging to a second domain distinct from the first domain, the instructions comprising instructions for printing that include a native command language of the peripheral device, wherein the peripheral device is connected to a user computing entity and comprises a printer, scanner or a scale;

providing, to a server outside of the second domain, the request for instructions over a second connection using a second protocol, wherein the server is located in a third domain distinct from the first and second domain, the first protocol is Hyper Text Transfer Protocol Secure (HTTPS) and the second protocol is a remote method invocation(RMI);

responsive to receiving the request at the server, providing, from the server to the application, shipping or labeling information comprising the instructions over the second connection using the second protocol; and providing, to the user computing entity, the shipping or labeling information comprising the instructions over the first secure encrypted connection using the first protocol for facilitating package shipping and remote control of the peripheral device.

7. The computer program product of claim 6, wherein the computing device is a web server, and the application is a web application at the web server.

* * * * *

UNITED STATES PATENT AND TRADEMARK OFFICE
CERTIFICATE OF CORRECTION

PATENT NO. : 10,142,368 B2
APPLICATION NO. : 14/842552
DATED : November 27, 2018
INVENTOR(S) : Brian Dick et al.

It is certified that error appears in the above-identified patent and that said Letters Patent is hereby corrected as shown below:

On the Title Page

Item (73) (Assignee): Please remove "Atlants, GA" and replace with --Atlanta, GA--.

In the Drawings

Sheet 5 of 18, Reference Numeral 506: Please remove "SELECTON" and replace with --SELECTION--.
Sheet 5 of 18, Reference Numeral 432: Please remove "postMESSAGE)" and replace with --(postMESSAGE)--.
Sheet 5 of 18, Reference Numeral 433: Please remove "(postMESAGE)" and replace with --(postMESSAGE)--.

In the Specification

Column 01, Line 37: After "relates" insert --to--.
Column 01, Line 66: Please remove "features." and replace with --features:--.
Column 02, Line 09: Please remove "features." and replace with --features:--.
Column 02, Line 27: Please remove "consigand" and replace with --consigned--.
Column 19, Line 12: Please remove "FIG." and replace with --FIGS.--.

In the Claims

Column 24, Line 04: Please remove "o" and replace with --to--.
Column 24, Line 34: Please remove "invocation(RMI)" and replace with --invocation (RMI)--.

Signed and Sealed this
Twelfth Day of February, 2019

Andrei Iancu
*Director of the United States Patent and Trademark Office*